(12) United States Patent
Payson et al.

(10) Patent No.: US 7,570,270 B2
(45) Date of Patent: Aug. 4, 2009

(54) BUFFER FOR DRIVING DISPLAY WITH ASYNCHRONOUS DISPLAY ENGINE

(75) Inventors: Christopher Payson, Bolton, MA (US); Landis Rogers, Kingston, NH (US)

(73) Assignee: Broadcom Corporation, Irvine, CA (US)

( * ) Notice: Subject to any disclaimer, the term of this patent is extended or adjusted under 35 U.S.C. 154(b) by 640 days.

(21) Appl. No.: 10/974,872

(22) Filed: Oct. 27, 2004

(65) Prior Publication Data

US 2005/0259748 A1 Nov. 24, 2005

Related U.S. Application Data

(60) Provisional application No. 60/573,151, filed on May 21, 2004.

(51) Int. Cl.
- G09G 5/36 (2006.01)
- G06T 7/20 (2006.01)
- G06T 1/60 (2006.01)
- G06F 13/00 (2006.01)
- H04N 7/12 (2006.01)
- H04N 9/44 (2006.01)
- H04B 13/00 (2006.01)
- H04N 9/64 (2006.01)
- G06T 15/00 (2006.01)

(52) U.S. Cl. ............... 345/558; 345/530; 345/536; 345/547; 348/387.1; 348/425.4; 348/500; 348/715; 375/240; 375/240.26; 375/240.28; 711/100; 711/170

(58) Field of Classification Search ......... 345/612, 345/530, 534–539, 545, 547, 555, 558–560, 345/567; 711/100, 148, 170; 710/57, 58, 710/60; 375/240.25, 240.26, 240, 240.28; 348/384.1, 500, 387, 390.1, 425.4, 715, 429–430, 348/542–543; 327/141
See application file for complete search history.

(56) References Cited

U.S. PATENT DOCUMENTS

| | | | | |
|---|---|---|---|---|
| 4,228,322 A * | 10/1980 | Bringol et al. | ....... | 704/211 |
| 5,691,746 A * | 11/1997 | Shyu | ....... | 345/604 |
| 5,767,863 A * | 6/1998 | Kimura | ....... | 345/547 |
| 5,781,707 A * | 7/1998 | Kunz et al. | ....... | 358/1.5 |
| 5,793,434 A * | 8/1998 | Lee | ....... | 348/445 |
| 5,852,443 A * | 12/1998 | Kenworthy | ....... | 345/441 |
| 5,861,864 A * | 1/1999 | Jensen | ....... | 715/500.1 |
| 5,953,020 A * | 9/1999 | Wang et al. | ....... | 345/558 |
| 6,064,393 A * | 5/2000 | Lengyel et al. | ....... | 345/427 |
| 6,266,095 B1 * | 7/2001 | Sunwoo | ....... | 348/473 |
| 6,970,206 B1 * | 11/2005 | Swan et al. | ....... | 348/448 |
| 7,202,870 B2 * | 4/2007 | Chen et al. | ....... | 345/501 |
| 2002/0054229 A1 * | 5/2002 | Sasaki | ....... | 348/312 |
| 2004/0236880 A1 * | 11/2004 | Barrett | ....... | 710/52 |
| 2005/0257748 A1 * | 11/2005 | Kriesel et al. | ....... | 119/51.02 |

* cited by examiner

OTHER PUBLICATIONS

U.S. Appl. No. 11/024,200, filed Jun. 2003, Royer, Roman.*

*Primary Examiner*—Wesner Sajous
(74) *Attorney, Agent, or Firm*—McAndrews, Held & Malloy, Ltd.

(57) ABSTRACT

Methods and systems for processing pixels within a decoded video stream are disclosed. Processed pixels may be received within the decoded video stream and may be buffered in a buffer at a first rate. The buffered received processed pixels may be transferred out of the buffer at a second rate, where the first rate is greater than said second rate. The buffering of the received processed pixels and the transferring of the buffered received processed pixels out of the buffer may be monitored to prevent an overrun of the buffer. The first rate of the buffering of the received processed pixels may be reduced to prevent the overrun of the buffer. The second rate of the transferring of the buffered received processed pixels out of the buffer may be monitored to prevent the overrun of the buffer. Amount of the buffered received processed pixels within the buffer may be determined.

45 Claims, 6 Drawing Sheets

BUFFER FOR DRIVING DISPLAY WITH ASYNCHRONOUS DISPLAY ENGINE

RELATED APPLICATIONS

This application makes reference to, claims priority to, and claims the benefit of U.S. Provisional Patent Application 60/573,151 filed on May 21, 2004 and entitled "Queue For Driving Display With Asynchronous Display Engine," the complete subject matter of which is hereby incorporated herein by reference in its entirety.

This application is related to the following applications, each of which is incorporated herein by reference in its entirety for all purposes:
U.S. patent application Ser. No. 11/000,731 filed Dec. 1, 2004;
U.S. patent application Ser. No. 10/963,677 filed Oct. 13, 2004;
U.S. patent application Ser. No. 10/985,501 filed Nov. 10, 2004;
U.S. patent application Ser. No. 11/112,632 filed Apr. 22, 2005;
U.S. patent application Ser. No. 10/985,110 filed Nov. 10, 2004;
U.S. patent application Ser. No. 10/965,172 filed Oct. 13, 2004;
U.S. patent application Ser. No. 10/972,931 filed Oct. 25, 2004;
U.S. patent application Ser. No. 10/974,179 filed Oct. 27, 2004;
U.S. patent application Ser. No. 10/970,923 filed Oct. 21, 2004;
U.S. patent application Ser. No. 10/963,680 filed Oct. 13, 2004;
U.S. patent application Ser. No. 11/013,768 filed Dec. 16, 2004;
U.S. patent application Ser. No. 11/102,389 filed Apr. 8, 2005;
U.S. patent application Ser. No. 11/135,929 filed May 23, 2005; and
U.S. patent application Ser. No. 11/000,676 filed Dec. 1, 2004.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Contemporary video processing systems utilize system-on-a-chip (SoC) design with multiple processing blocks integrated on a single chip. SoC systems have multiple interfaces, some using standards with different clock frequencies. For example, a video decoder may be implemented on a single chip with a post-processing engine, such as a video display engine. During processing of a video signal within the video decoder or the post-processing engine, the processed video signal may be communicated across asynchronous domains that operate on different clock frequencies. For example, a processed video signal may be communicated from a video display engine operating on one frequency to a video display operating on a different frequency. Asynchronous domain crossings decrease the processing speed and video signal processing efficiency within a video processing system as signals need to be synchronized when crossing between asynchronous devices. The operating frequency of one or more devices may be changed to achieve synchronization.

For example, a conventional video display engine may receive a decoded video signal from a decoder and may further process the decoded video signal prior to communicating the signal for display on a video display terminal. Current video signal processing systems may utilize video display synchronization (sync) signals, such as a video horizontal sync signal and/or a video vertical sync signal, to control video display engine operation. Such synchronization signals may be received from a display device that is presenting the video information being provided by the video display engine in a human perceivable form. Synchronizing video display engine operation to such video display synchronization signal(s) may limit performance of the video display engine by decreasing the signal processing speed, thereby resulting in inefficient operation of the video processing system.

Further limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

Certain embodiments of the invention may be found in a method and system for processing pixels within a decoded video stream. Processed pixels may be received within the decoded video stream and may be buffered in a buffer at a first rate. The buffered received processed pixels may be transferred out of the buffer at a second rate, where the first rate is greater than said second rate. The buffering of the received processed pixels and the transferring of the buffered received processed pixels out of the buffer may be monitored to prevent an overrun of the buffer. The first rate of the buffering of the received processed pixels may be reduced to prevent the overrun of the buffer. The second rate of the transferring of the buffered received processed pixels out of the buffer may be monitored to prevent the overrun of the buffer.

An amount of the buffered received processed pixels within the buffer may be determined. If the determined amount of the buffered received processed pixels within the buffer is below a determined level, a second portion of processed pixels may be buffered. A synchronization signal may be generated utilizing the buffered received processed pixels. The generated synchronization signal may comprise a vertical synchronization signal and/or a horizontal synchronization signal. The buffered received processed pixels may be formatted into PAL, NTSC, 1080i, 720p, and/or 480p display formats, for example.

A number of pixels or pixel lines may be determined within the buffered received processed pixels. The decoded video stream may be scaled according to the determined number of pixels or pixel lines within the buffered received processed pixels. The transferred buffered received processed pixels may be displayed.

Another embodiment of the invention may provide a machine-readable storage, having stored thereon, a computer program having at least one code section executable by a machine, thereby causing the machine to perform the steps as described above for processing pixels within a decoded video stream.

Aspects of the system for processing pixels within a decoded video stream may comprise at least one processor that receives processed pixels within the decoded video stream and buffers the received processed pixels in a buffer at a first rate. The buffered received processed pixels may be transferred by the processor out of the buffer at a second rate, where the first rate is greater than the second rate. The buffering of the received processed pixels and the transferring of the buffered received processed pixels out of the buffer may be monitored by the processor to prevent an overrun of the buffer. The processor may decrease the first rate of the buffering of the received processed pixels to prevent the overrun of the buffer. The second rate of the transferring of the buffered received processed pixels out of the buffer may be increased by the processor to prevent the overrun of the buffer.

The processor may determine an amount of the buffered received processed pixels within the buffer. If the determined amount of the buffered received processed pixels within the buffer is below a determined level, a second portion of processed pixels may be buffered by the processor. A synchronization signal may be generated by the processor utilizing the buffered received processed pixels, where the generated synchronization signal may comprise a vertical synchronization signal and/or a horizontal synchronization signal. The buffered received processed pixels may be formatted by the processor into a PAL, NTSC, 1080i, 720p, and/or 480p display formats, for example. The processor may determine a number of pixels or pixel lines within the buffered received processed pixels. The decoded video stream may be scaled by the processor according to the determined number of pixels or pixel lines within the buffered received processed pixels. The transferred buffered received processed pixels may be displayed.

These and other features and advantages of the present invention may be appreciated from a review of the following detailed description of the present invention, along with the accompanying figures in which like reference numerals refer to like parts throughout.

DETAILED DESCRIPTION OF THE INVENTION

Certain aspects of the invention may be found in a method and system for processing pixels within a decoded video stream. After an elementary video stream is decoded by a video decoder, the decoded video stream may be further processed by a post-processor within a video display engine. For example, the post-processor may deinterlace the decoded video signal and may scale the deinterlaced signal horizontally and/or vertically. The post-processed signal may then be communicated to a display interface and subsequently to a video display. In one aspect of the invention, in order to minimize the effect of asynchronous domain crossing during communication of the post-processed signal from the video display engine to the video display, a buffer may be provided between the post-processor and the display interface within the video display engine.

In this manner, the post-processor may be decoupled from the video display and different operating frequencies may be utilized on both sides of the buffer. Decoded video stream information may be stored in the buffer at a higher rate than the rate utilized by the video display interface to take decoded video stream information out of the buffer. A separate buffer management module and/or a dedicated central processing unit (CPU) may be provided to monitor the buffer and control the flow of processed video signal information through the buffer so that a buffer overrun may be avoided. By decoupling the post-processor from the video display via the buffer, different video display standards may be supported within the same video processing system. In addition, the number of post-processing tasks relating to the decoded video signal may be increased without decreasing processing time and efficiency.

Figure 1A:
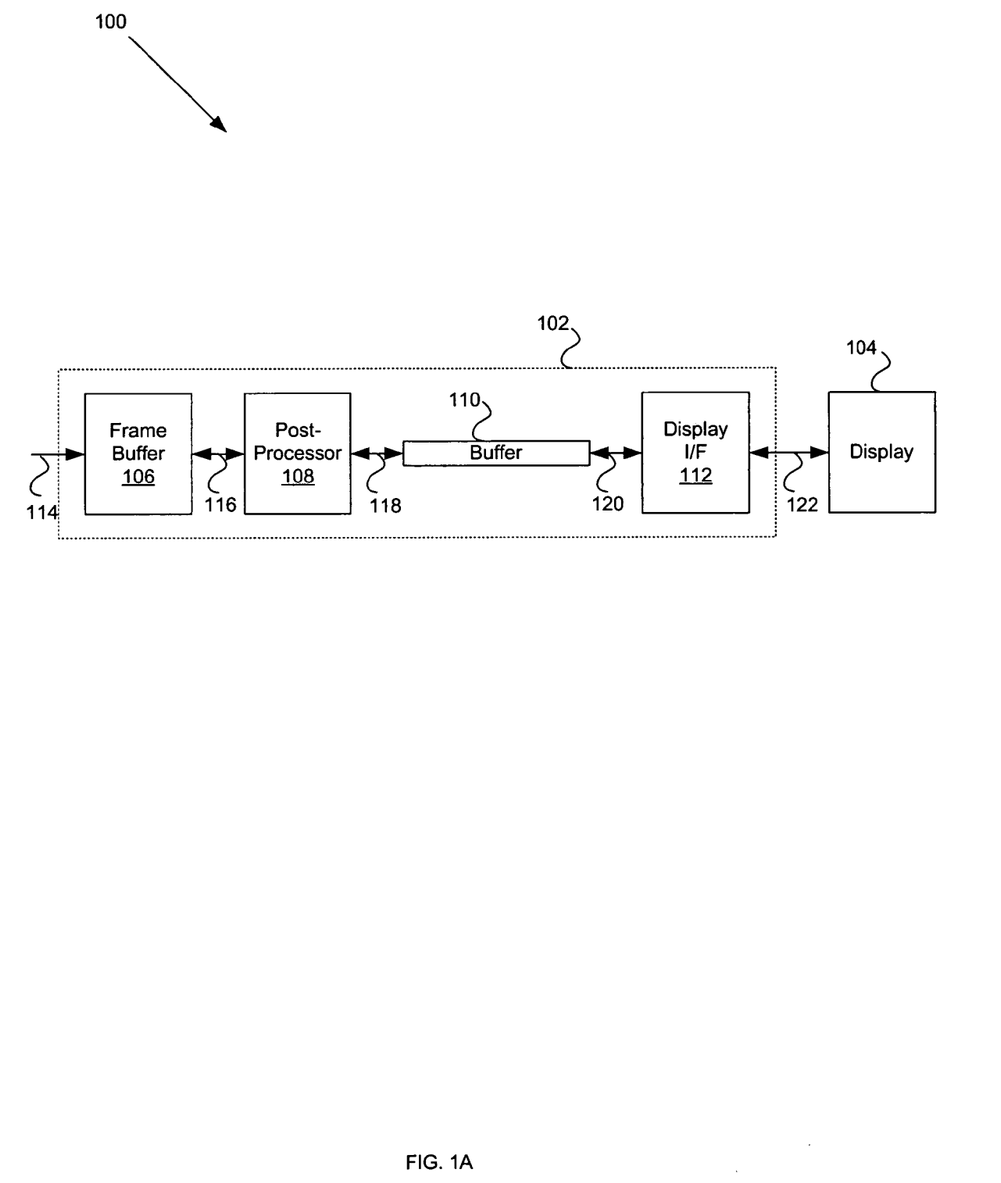
FIG. 1A is a block diagram illustrating an exemplary video system for processing a decoded video stream, in accordance with an embodiment of the invention.

FIG. 1A is a block diagram illustrating an exemplary video system 100 for processing a decoded video stream, in accordance with an embodiment of the invention. Referring to FIG. 1A, the video system 100 may comprise a video display engine 102 and a display 104. The video display engine 102 may comprise a frame buffer 106, a post-processor 108, a buffer 110, and a display interface 112.

The frame buffer 106 may comprise suitable circuitry and/or logic and may be adapted to store decoded video stream information 114. The decoded video stream information 114 may be generated from upstream processing within one or more preceding blocks. Such upstream processing may, for example, comprise video data decrypting, decoding, filtering, scaling, cropping, padding, upsampling, downsampling, mixing, and/or blending.

The post-processor 108 comprises suitable circuitry, logic and/or code and may be adapted to further process a decoded video signal. In an embodiment of the invention, the post-processor 108 may comprise a deinterlacer and/or scaler. For example, the post-processor 108 may be adapted to de-interlace and/or scale a decoded video signal prior to communicating the signal to a video display. The post-processor 108 may pull, or read, buffered video information 116 from the frame buffer 106, for example, in a sequential order. After post-processing the buffered video information 116, the post-processor may store the post-processed video information 118 in the buffer 110.

The buffer 110 may comprise suitable circuitry and/or logic and may be adapted to store post-processed video information 118 prior to displaying such information by the display 104. The buffer 110, for example, may be implemented as a circular buffer or it may be adapted to shift information through chained registers. In addition, the buffer 110 may be implemented with various lengths. For example, the buffer 110 may be adapted to store an entire line of video information or a portion of a line, such as $\frac{1}{8}^{th}$ of a line. Notwithstanding, the scope of various aspects of the present invention may not be limited by characteristics of a particular buffer implementation.

The display interface 112 comprises suitable circuitry, logic and/or code and may be adapted to pull the buffered post-processed video information 120 from the buffer 110 and communicate formatted video information 122 to the display 104. The display interface 112 may be adapted to retrieve the buffered post-processed video information 120 from the buffer 110 on an as-needed basis, for example by counting pixels and/or pixel lines within the post-processed video information 120. The display interface 112 may, for example, receive a synchronization signal, such as a horizontal and/or a vertical sync signal from the display device 104, and may retrieve and process the buffered video information 120 from the buffer 110 at timing determined by the synchronization signal(s) received from the display 104. For example, and without limitation, the display interface 112 may receive a horizontal sync signal from the display device 104 and may pull a line of video data from the buffer 110. The display interface 112 may then convert the pulled video information into one or more analog signals 122 to drive the display device 104.

In operation, decoded video stream information 114 may be buffered by the frame buffer 106. The buffered video stream information 116 may then be communicated to the post-processor 108 for further processing. For example, the post-processor 108 may de-interlace the received video stream information 116. In addition, the post-processor 108 may horizontally and/or vertically scale the received video stream information 116 in accordance with display characteristics utilized by the video display 104. The post-processed video information 118 may be stored in the buffer 110 prior to communicating the post-processed information to the display interface 112 and to the display device 104.

In one aspect of the invention, the post-processor 108 may be adapted to operate and process video information at a higher rate than the processing rate of the display interface 112. The buffer 110 may be utilized to decouple the asynchronous operations performed by the post-processor 108 and the display interface 112. In this manner, the post-processor 108 may operate at a faster rate allowing for implementation of additional processing tasks by the post-processor 108. In addition, by decoupling the video display 104 from the post-processor 108 via the buffer 110, the video display 104 may support different monitor frequencies and video display standards, such as HDTV, PAL, and/or NTSC, for example.

In an aspect of the invention, the buffer 110 may be monitored so that it may not be emptied by the display interface 112. For example, a buffer management module and/or a dedicated CPU may be provided, as illustrated in FIG. 1C, so that the empty space within the buffer 110 is constantly monitored. Upon determining that the buffer 110 has room for additional information, the post-processor 108, for example, may provide additional post-processed video information 118 to the buffer 110.

Figure 1B:
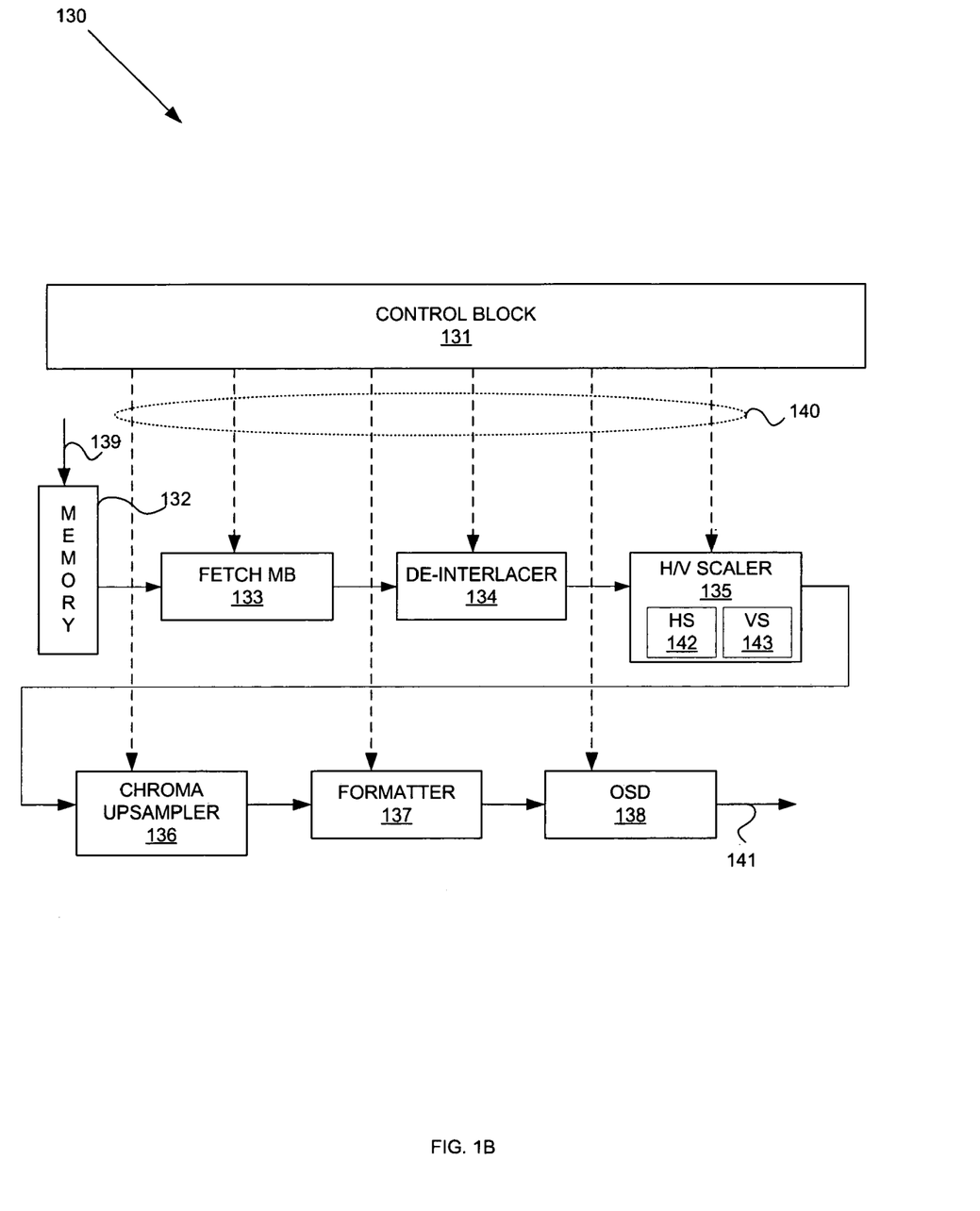
FIG. 1B is a high level block diagram of an exemplary post-processor that may be utilized in accordance with a video system for processing a decoded video stream, in accordance with an embodiment of the invention.
Figure 1C:
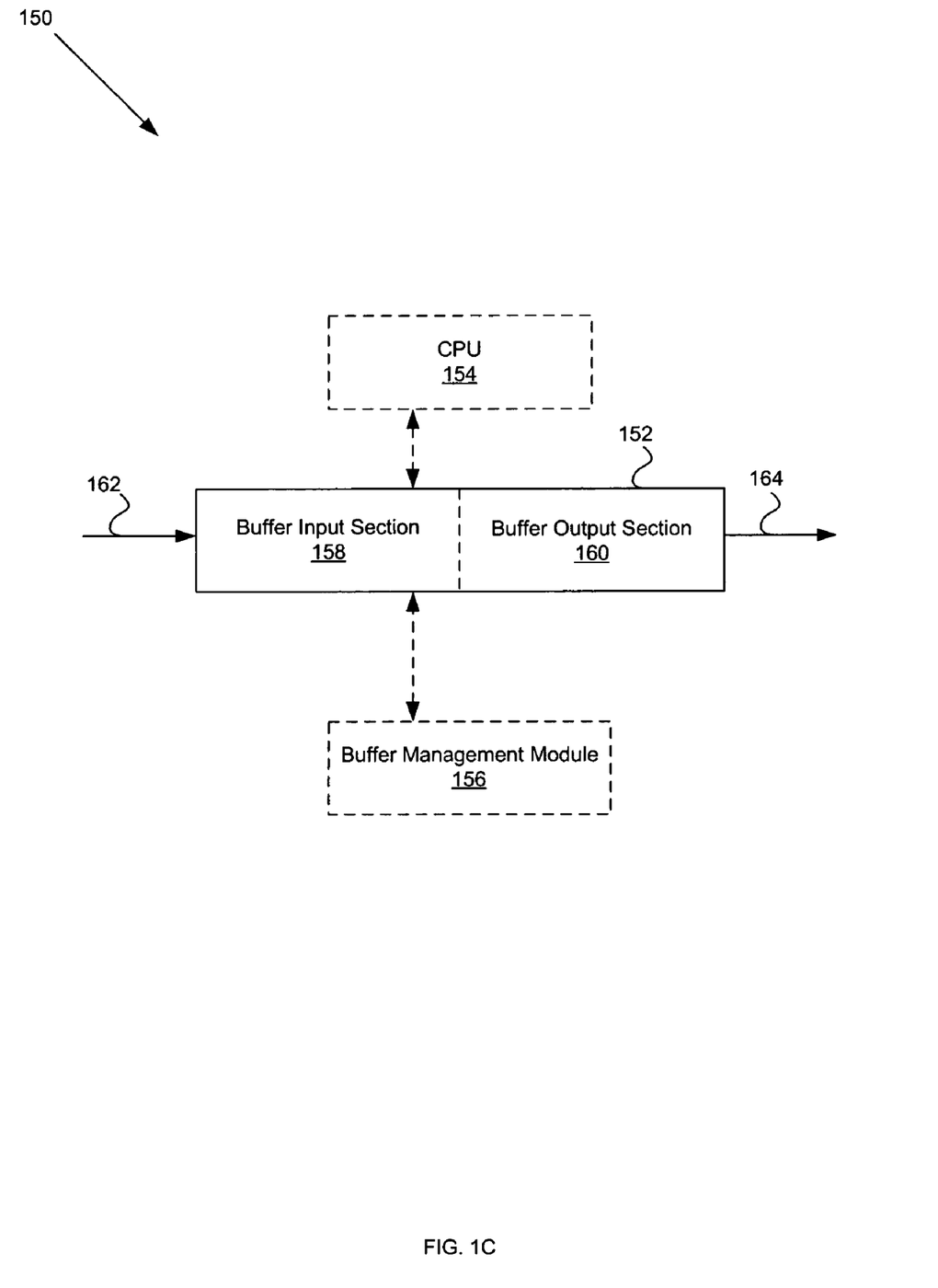
FIG. 1C is a block diagram of an exemplary buffer that may be utilized during processing a decoded video stream, in accordance with an embodiment of the invention.

FIG. 1B is a high level block diagram of an exemplary post-processor 130 that may be utilized in accordance with a video system for processing a decoded video stream, in accordance with an embodiment of the invention. Referring to FIG. 1B, the post processor 130 may comprise a control and status block 131, a memory block 132, a macroblock transport block 133, a de-interlacer 134, a horizontal/vertical (H/V) scaler 135, a chroma upsampler 136, a formatter 137 and an on-screen-display (OSD) block 138. The H/V scaler 135 may comprise a horizontal scaler 142 and/or a vertical scaler 143.

In operation, a decoded video signal 139 may be stored in the memory block 132. The macroblock transport block 133 may be adapted to fetch data from the memory block 132 as frames, regardless of whether the video signal 139 is in a progressive or an interlaced format. The transport block 133 may comprise a filter which may be selected according to the signal source format. For example, a progressive filter may calculate new chroma values from adjacent samples, and an interlaced filter may calculate new chroma values from adjacent lines in a field.

The de-interlacer 134 may acquire from the transport block 133, video data from two opposite fields, or a matched field pair, and may merge the data back into a progressive frame stream via a weighted selection algorithm, for example. Opposite field pixels may be generated by the de-interlacer 134 by selecting co-located pixels from opposite field data, or by averaging the top and bottom neighboring pixels from the same field. A co-located pixel may be selected if it is the median of the neighboring pixels, otherwise an average pixel may be selected.

The horizontal scaler 142 within the H/V scaler 135 may acquire input lines of length N pixels from the de-interlacer 134 and may scale them to output lines of length M pixels, where both N and M may be integers from 1 to 16. The scaling within the horizontal scaler 142 may be accomplished via a 16-phase, 5-tap filter utilizing 8-bit signed coefficients for luma and chroma components. Both luma and chroma components may be scaled by the same N:M scaling ratio, but the signed coefficients may be independent.

The vertical scaler 143 within the H/V scaler 135 may acquire input pictures of length N lines from the de-interlacer 134 and may scale them to output pictures of length M lines, where both N and M may be integers from 1 to 16, for example. The scaling within the vertical scaler 143 may be accomplished via a 16-phase, 5-tap filter using 8-bit signed coefficients for luma components, while 3 taps may be used for chroma components. In one embodiment of the invention, both luma and chroma components may be scaled by the same N:M scaling ratio, but the signed coefficients may be independent.

The chroma upsampler 136 may be adapted to generate additional chrominance information within the decoded video signal. For example, the chroma upsampler 136 may comprise a 4:2:2 upsampler and may be adapted to generate additional chrominance information from 4:2:0 video data by using one of two upsampling filters. The upsampling filters within the chroma upsampler 136 may generate progressive and/or interlaced 4:2:2 output data.

The formatter 137 may be adapted to accept words of all-luma or all-chroma pixels, and may merge them to the required "YUV" format for output. The formatter 137 may also be adapted to perform final cropping and/or zero-padding operations for exact video signal output sizing after scaling, for example. The beginning of each frame and/or line may be indicated by a start-of-frame (SOF) and/or start-of-line (SOL) signal or delimiter, which may be generated by the formatter 137.

The OSD module 138 may be adapted to fetch OSD pixels and alpha-blend values from the memory module 132 and optionally merge them with outgoing video image data 141. Video data generated by the OSD module 138 may comprise interleaved 4:2:2 ratio data and alpha blend values at full output image resolution or ¼ output image resolution.

The de-interlacer 134, the H/V scaler 135, the chroma upsampler 136, and the OSD module 138 may be optional blocks and may or may not be included within the post-processor 130. In one aspect of the invention, the horizontal and vertical filters within the horizontal scaler 142 and the vertical scaler 143, respectively, may be programmed independently, where one or both scalers may be bypassed for no scaling operation. If H/V scaler 135 is included within the post-processor 130, the chroma upsampler 136 may be omitted as the H/V scaler 135 may be adapted to perform chroma upsampling together with scaling.

The control and status block 131 comprises suitable circuitry, logic and/or code and may be adapted to provide a plurality of control commands 140 for processing blocks within the post-processor 130. For example, the control block 131 may provide control commands to the macroblock transport block 133, the de-interlacer 134, the H/V scaler 135, the chroma upsampler 136, the formatter 137, and/or the OSD module 138.

FIG. 1C is a block diagram 150 of an exemplary buffer that may be utilized while processing a decoded video stream, in accordance with an embodiment of the invention. Referring to FIG. 1C, the buffer 152 may comprise a buffer input section 158 and a buffer output section 160 and may be utilized within a video display engine to decouple a post-processor, for example, from a video display.

In operation, a post-processor may be connected to the buffer 152 so that the post-processor may store processed video information 162 within the buffer input section 158. The buffer 152 may also be coupled to a display interface, for example, so that buffered video information 164 may be fetched by a display interface from the buffer output section 160. In an exemplary aspect of the invention, processed video information 162 may be stored at a faster rate than the rate at which buffer video information 164 is pulled from the buffer output section 160. In this manner, the post-processor may be decoupled from the display interface and each block may operate at different operating cycle.

In another aspect of the invention, a CPU 154 and/or a buffer management module 156 may be utilized to monitor remaining capacity within the buffer 152. For example, the buffer management module 156 may notify the post-processor, for example, when the buffer 152 is above a threshold level of emptiness. Alternatively, for example, the post-processor may actively monitor the conditions of the buffer 152. For example and without limitation, a buffer management module 156 and/or a post-processor may monitor the amount of free space in the buffer 152. Determination of whether to store additional video information 162 into the buffer input section 158 may be based on a particular degree of emptiness or fullness of the buffer 152. For example, if the buffer 152 is ¾ empty, the CPU 154 and/or the buffer management module 156 may determine that the post-processor should provide additional video information 162 to the buffer 152. Similarly, if the buffer 152 is ⅛ empty, buffering into the buffer input section 158 may be performed at a reduced rate and/or temporarily stopped. Accordingly, the scope of various aspects of the present invention should not be limited by a particular post-processor and/or buffer interface for monitoring remaining buffer storage capacity.

Figure 2:
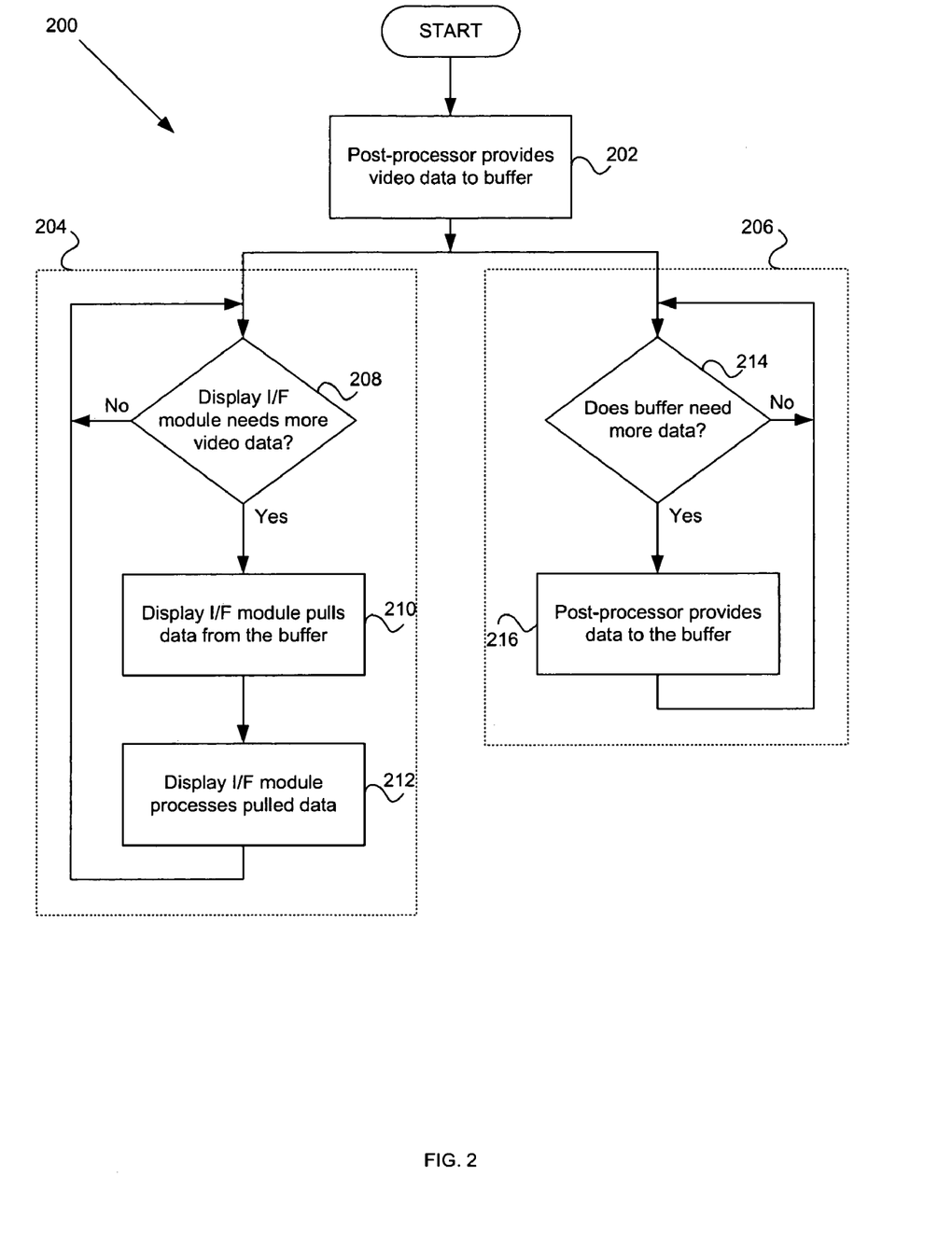
FIG. 2 is a flow diagram illustrating an exemplary method for utilizing a buffer to control display engine operation, in accordance with an embodiment of the invention.

FIG. 2 is a flow diagram illustrating an exemplary method 200 for utilizing a buffer to control display engine operation, in accordance with an embodiment of the invention. In accordance with the method 200, a buffer may be utilized to separate a post-processor from a display interface module. Referring to FIG. 2, operation cycle 204 illustrates exemplary display interface module processing, and operation cycle 206 illustrates exemplary post-processor functionality for buffering video data.

During the exemplary display interface module processing, at 208, it may be determined whether the display interface module needs more video data. If the display interface needs more video data, at 210, the display interface module may pull video data from the buffer. At 212, the display interface module may process the video data obtained from the buffer and may subsequently communicate the video data to a video display, for example. With regard to the exemplary post-processor functionality, at 214, it may be determined whether the buffer requires more video data. For example, a buffer management module and/or a dedicated CPU may be utilized to monitor the current buffer emptiness to avoid empty operating cycles and/or buffer overruns. If the buffer management module and/or the CPU determines that the buffer requires more data, at 216, the post-processor may provide and buffer more video data within the buffer.

Figure 3:
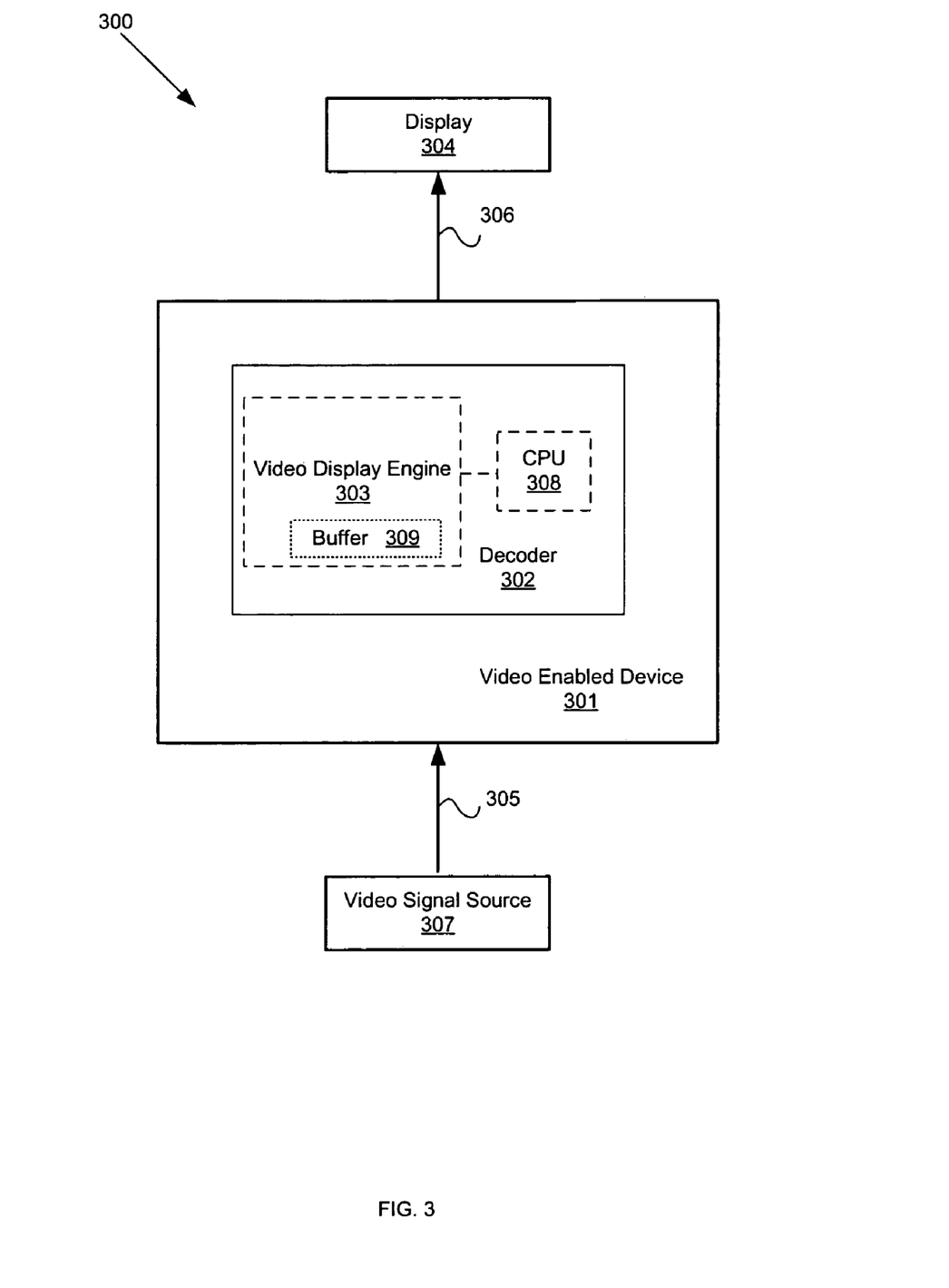
FIG. 3 is a block diagram illustrating an exemplary system for video decoding utilizing a video display engine with buffer, in accordance with an embodiment of the invention.

FIG. 3 is a block diagram illustrating an exemplary system 300 for video decoding utilizing a video display engine with buffer, in accordance with an embodiment of the invention. Referring to FIG. 3, the video signal processing system 300 may comprise a video signal source 307, a video enabled device 301 and a display 304. The video signal source 307 may comprise a video encoder and may be adapted to generate an elementary video stream 305. The video signal source 307 may utilize one or more video encoding standards, such as MPEG-4, for example, and may be implemented as a video head end, for example. The video signal source 307 may communicate the elementary video stream 305 to the video enabled device 301 for further processing, including decoding of the elementary video stream 305 and post-processing. The video signal source 307 may be connected to the video enabled device 301 via a wired and/or a wireless connection.

The video enabled device 301 comprises suitable circuitry, logic and/or code and may be adapted to process an elementary video stream 305. For example, the video enabled device 301 may comprise a decoder 302 and may be adapted to decode and post-process the elementary video signal 305 to generate a decoded video signal 306. The video enabled device 301 may be implemented as a cable set top box, a satellite receiver box, a hand held device such as a PDA and/or cellular phone, a computer, and/or a digital antenna tuner, for example.

In one aspect of the invention, the video enabled device 301 may comprise a decoder 302. The decoder 302 may be adapted to decode the elementary video stream 305 and to post-process the decoded video stream utilizing a video display engine 303. The video display engine 303 may utilize a post-processor to post-process the decoded video stream and de-interlace and/or scale the video signal, for example. In addition, a buffer 309 may be utilized within the video display engine 303 to decouple the post-processor from the display 304. A CPU 308 may be utilized to monitor a current capacity of the buffer 309 so that empty operating cycles and/or buffer overrun may be avoided.

Within the decoder 302, the CPU 308 may receive processed pixels within a decoded video stream and may buffer the received processed pixels in buffer 309 at a first rate. The buffered received processed pixels may be transferred by the CPU 308 out of the buffer 309 at a second rate, where the first rate is greater than the second rate. The buffering of the received processed pixels and the transferring of the buffered received processed pixels out of the buffer 309 may be monitored by the CPU 308 to prevent an overrun of the buffer 309. The CPU 308 may also decrease the first rate of the buffering of the received processed pixels to prevent the overrun of the buffer 309. The second rate of the transferring of the buffered received processed pixels out of the buffer 309 may be increased by the CPU 308 to prevent overrun of the buffer 309.

An amount of the buffered pixels within the buffer 309 may be determined by the CPU 308. If the determined amount of the buffered pixels within the buffer 309 is below a determined threshold level, a second portion of processed pixels may be buffered by the CPU 308. A synchronization signal may be generated by the CPU 308 utilizing the buffered pixels, where the generated synchronization signal may comprise a vertical synchronization signal and/or a horizontal synchronization signal. The buffered pixels may be formatted by the CPU 308 into PAL display format and/or NTSC display format, and a number of pixels or pixel lines within the buffered pixels may be determined. The decoded video stream may be scaled by the CPU 308 according to the determined number of pixels, or pixel lines, within the buffered pixels. After the elementary video stream 305 is decoded, the decoded and post-processed video signal 306 may be communicated to a display 304 for further processing. The display 304 may be implemented within a television or other video screen, for example, and may be adapted to display the decoded and post-processed video signal 306.

In one aspect of the invention, video signals in PAL, NTSC, 1080i, 720p, and/or 480p display formats may be processed. However, the present invention may not be limited in this manner and video signals in other display standards may also be processed in accordance with aspects of the invention.

Figure 4:
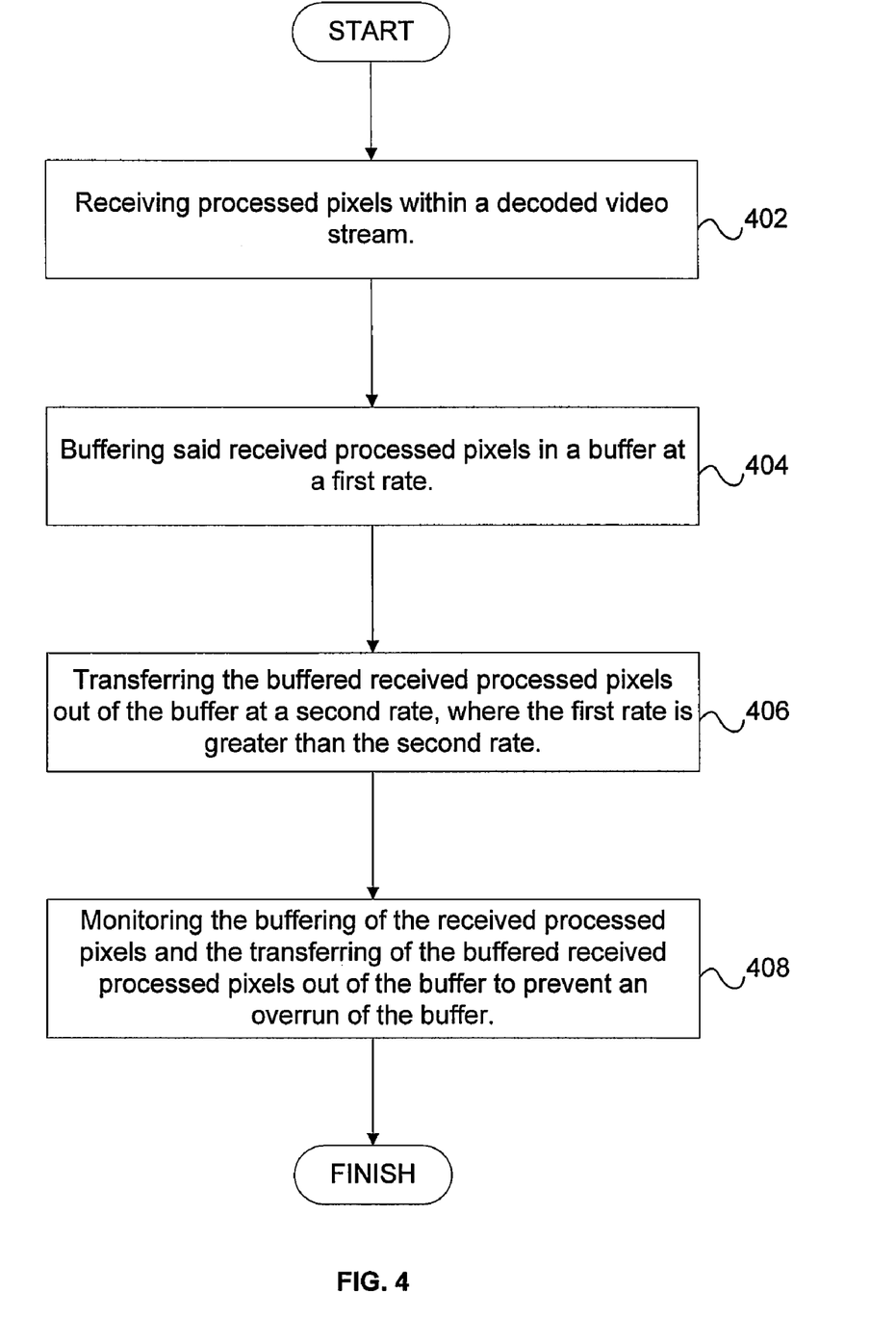
FIG. 4 is a flow diagram of exemplary steps for processing pixels within a decoded video stream, in accordance with an embodiment of the invention.

FIG. 4 is a flow diagram of exemplary steps for processing pixels within a decoded video stream, in accordance with an embodiment of the invention. Referring to FIG. 4, at 402, processed pixels within the decoded video stream may be received. At 404, the received processed pixels may be buffered in a buffer at a first rate. At 406, the buffered received processed pixels may be transferred out of the buffer at a second rate. The first rate may be greater than the second rate. At 408, the buffering of the received processed pixels and the transferring of the buffered received processed pixels out of the buffer may be monitored to prevent an overrun of the buffer.

Accordingly, aspects of the invention may be realized in hardware, software, firmware or a combination thereof. The invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

The invention claimed is:

1. A method for processing pixels within a decoded video stream, the method comprising:
   receiving processed pixels from a first buffer within the decoded video stream;
   post-processing said processed pixels, wherein said post-processed pixels comprise deinterlaced video data selected from two opposite fields or a matched field pair;
   buffering said post-processed pixels in a second buffer at a first rate, wherein said first rate is determined during said post-processing;
   transferring said buffered post-processed pixels out of said second buffer at a second rate, wherein said first rate is greater than said second rate; and
   monitoring said buffering of said post-processed pixels and said transferring of said buffered post-processed pixels out of said second buffer to prevent an overrun of said second buffer.

2. The method according to claim 1, comprising decreasing said first rate of said buffering of said post-processed pixels to prevent said overrun of said second buffer.

3. The method according to claim 1, comprising increasing said second rate of said transferring of said buffered post-processed pixels out of said second buffer to prevent said overrun of said second buffer.

4. The method according to claim 1, comprising determining an amount of said buffered post-processed pixels within said second buffer.

5. The method according to claim 4, comprising buffering a second portion of post-processed pixels, if said determined amount of said buffered post-processed pixels within said second buffer is below a determined level.

6. The method according to claim 1, comprising generating at least one synchronization signal utilizing said buffered post-processed pixels.

7. The method according to claim 6, wherein said generated at least one synchronization signal comprises one or both of a vertical synchronization signal and/or a horizontal synchronization signal.

8. The method according to claim 1, comprising formatting said buffered post-processed pixels into one or more of PAL, NTSC, 1080i, 720p, and/or 480p display formats.

9. The method according to claim 1, comprising determining a number of pixels or pixel lines within said buffered post-processed pixels.

10. The method according to claim 9, comprising scaling the decoded video stream according to said determined number of pixels or pixel lines within said buffered post-processed pixels.

11. The method according to claim 1, comprising displaying said transferred buffered post-processed pixels.

12. A machine-readable storage having stored thereon, a computer program having at least one code section for processing pixels within a decoded video stream, the at least one code section being executable by a machine to perform steps comprising:
receiving processed pixels from a first buffer within the decoded video stream;
post-processing said processed pixels, wherein said post-processed pixels comprise deinterlaced video data selected from two opposite fields or a matched field pair;
buffering said post-processed pixels in a second buffer at a first rate, wherein said first rate is determined during said post-processing;
transferring said buffered post-processed pixels out of said second buffer at a second rate, wherein said first rate is greater than said second rate; and
monitoring said buffering of said post-processed pixels and said transferring of said buffered post-processed pixels out of said second buffer to prevent an overrun of said second buffer.

13. The machine-readable storage according to claim 12, comprising code for decreasing said first rate of said buffering of said post-processed pixels to prevent said overrun of said second buffer.

14. The machine-readable storage according to claim 12, comprising code for increasing said second rate of said transferring of said buffered post-processed pixels out of said second buffer to prevent said overrun of said second buffer.

15. The machine-readable storage according to claim 12, comprising code for determining an amount of said buffered post-processed pixels within said second buffer.

16. The machine-readable storage according to claim 15, comprising code for buffering a second portion of post-processed pixels, if said determined amount of said buffered post-processed pixels within said second buffer is below a determined level.

17. The machine-readable storage according to claim 12, comprising code for generating at least one synchronization signal utilizing said buffered post-processed pixels.

18. The machine-readable storage according to claim 17, wherein said generated at least one synchronization signal comprises one or both of a vertical synchronization signal and/or a horizontal synchronization signal.

19. The machine-readable storage according to claim 12, comprising code for formatting said buffered post-processed pixels into one or more of PAL, NTSC, 1080i, 720p, and/or 480p display formats.

20. The machine-readable storage according to claim 12, comprising code for determining a number of pixels or pixel lines within said buffered post-processed pixels.

21. The machine-readable storage according to claim 20, comprising code for scaling the decoded video stream according to said determined number of pixels or pixel lines within said buffered post-processed pixels.

22. The machine-readable storage according to claim 12, comprising code for displaying said transferred buffered post-processed pixels.

23. A system for processing pixels within a decoded video stream, the system comprising:
at least one processor operable to receive processed pixels from a frame buffer within the decoded video stream;
said at least one processor is operable to post-process said processed pixels, wherein said post-processed pixels comprise deinterlaced video data selected from two opposite fields or a matched field pair;
said at least one processor is operable to buffer said post-processed pixels in a second buffer at a first rate, wherein said first rate is determined by said at least one processor;
said at least one processor is operable to transfer said buffered post-processed pixels out of said second buffer at a second rate, wherein said first rate is greater than said second rate; and
said at least one processor is operable to monitor said buffering of said post-processed pixels and said transferring of said buffered post-processed pixels out of said second buffer to prevent an overrun of said second buffer.

24. The system according to claim 23, wherein said at least one post-processor is operable to decrease said first rate of said buffering of said post-processed pixels to prevent said overrun of said second buffer.

25. The system according to claim 23, wherein said at least one post-processor is operable to increase said second rate of said transferring of said buffered post-processed pixels out of said second buffer to prevent said overrun of said second buffer.

26. The system according to claim 23, wherein said at least one post-processor is operable to determine an amount of said buffered post-processed pixels within said second buffer.

27. The system according to claim 26, wherein said at least one post-processor is operable to buffer a second portion of post-processed pixels, if said determined amount of said buffered second processed pixels within said second buffer is below a determined level.

28. The system according to claim 23, wherein said at least one post-processor is operable to generate at least one synchronization signal utilizing said buffered post-processed pixels.

29. The system according to claim 28, wherein said generated at least one synchronization signal comprises one or both of a vertical synchronization signal and/or a horizontal synchronization signal.

30. The system according to claim 23, wherein said at least one post-processor is operable to format said buffered post-processed pixels into one or more of PAL, NTSC, 1080i, 720p, and/or 480p display formats.

31. The system according to claim 23, wherein said at least one post-processor is operable to determine a number of pixels or pixel lines within said buffered post-processed pixels.

32. The system according to claim 31, wherein said at least one processor is operable to scale the decoded video stream according to said determined number of pixels or pixel lines within said buffered post-processed pixels.

33. The system according to claim 23, wherein said at least one post-processor is operable to display said transferred buffered post-processed pixels.

34. The method according to claim 1, wherein said first buffer is a frame buffer.

35. The method according to claim 1, wherein said second buffer is a display FIFO memory buffer.

36. The method according to claim 1, wherein said post-processing is performed by a post-processor.

37. The method according to claim 1, wherein said first rate is determined by a post-processor.

38. The machine-readable storage according to claim 12, wherein said first buffer is a frame buffer.

39. The machine-readable storage according to claim 12, wherein said second buffer is a display FIFO memory buffer.

40. The machine-readable storage according to claim 12, wherein said post-processing is performed by a post-processor.

41. The machine-readable storage according to claim 12, wherein said first rate is determined by a post-processor.

42. The system according to claim 23, wherein said first buffer is a frame buffer.

43. The system according to claim 23, wherein said second buffer is a display FIFO memory buffer.

44. The system according to claim 23, wherein said post-processed pixels are processed by a post-processor.

45. The system according to claim 23, wherein said first rate is determined by a post-processor.

* * * * *